United States Patent [19]

Stein et al.

[11] 4,359,562

[45] Nov. 16, 1982

[54] PROCESS FOR PRODUCING ETHYLENE POLYMERS AND COPOLYMERS BY MEANS OF A SUPPORTED CATALYST OF A CHROMIUM-HYDROCARBON COMPLEX ON AN INORGANIC OXIDE CARRIER

[75] Inventors: Dieter Stein, Limburgerhof; Robert Bachl, Worms; Konrad Richter, Ludwigshafen, all of Fed. Rep. of Germany

[73] Assignee: BASF Aktiengesellschaft, Fed. Rep. of Germany

[21] Appl. No.: 284,380

[22] Filed: Jul. 17, 1981

[30] Foreign Application Priority Data

Aug. 8, 1980 [DE] Fed. Rep. of Germany ....... 3030055

[51] Int. Cl.$^3$ ................................................ C08F 4/78
[52] U.S. Cl. ............................... 526/129; 252/431 R; 526/352
[58] Field of Search ........................................ 526/129

[56] References Cited

FOREIGN PATENT DOCUMENTS 1253063  11/1971  United Kingdom .

Primary Examiner—Stanford M. Levin
Attorney, Agent, or Firm—Keil & Witherspoon

[57] ABSTRACT

A process for the preparation of ethylene homopolymers, and ethylene copolymers with minor amounts of higher α-monoolefins, by polymerizing the monomer or monomers by means of a supported catalyst (1) containing a chromium-hydrocarbon complex (1.2) on an inorganic oxide carrier (1.1), wherein (1) a supported catalyst is employed which contains (1.2) a chromium-hydrocarbon complex of the formula RCrACrR, where R is a cyclic and/or open-chain hydrocarbon, or hydrocarbon radical, of 2n and 2n+1 carbon atoms respectively and having from 1 to n non-cumulated double bonds, n being from 2 to 10, Cr is chromium and A is cyclooctatetraene, a divalent n-octatetraene radical or alkyl-substituted homologs thereof, on (1.1) a particular inorganic oxide carrier, with or without (2) a cocatalyst chosen from a particular group of alkyl-aluminum compounds. The process gives polymers having a particularly broad molecular weight distribution.

1 Claim, No Drawings

PROCESS FOR PRODUCING ETHYLENE POLYMERS AND COPOLYMERS BY MEANS OF A SUPPORTED CATALYST OF A CHROMIUM-HYDROCARBON COMPLEX ON AN INORGANIC OXIDE CARRIER

The present invention relates to a process for the preparation of ethylene homopolymers, and of ethylene copolymers with minor amounts of $C_3$–$C_6$-α-monoolefins, by polymerizing the monomer or monomers at from 30° to 200° C., especially from 50° to 150° C., under a pressure of from 0.1 to 200 bars especially from 1 to 60 bars, using a supported catalyst (1) which contains a chromium-hydrocarbon complex (1.2) on an inorganic oxide carrier (1.1).

Processes of this type are known, an example being disclosed in German Published Application DAS 1,808,388 (equivalent to British Pat. No. 1,253,063).

These processes exhibit certain peculiarities relative to comparable processes of a different type, and, depending on the desired effect, these peculiarities can offer advantages. An example of the peculiarities is that not only can the molecular weight of the product be particularly well regulated by means of hydrogen, but even relatively small amounts of hydrogen produce a relatively great increase in productivity, ie. in yield of product per unit amount of catalyst.

The processes of the type in question are furthermore capable of giving polymers which exhibit special features compared to polymers obtainable by comparable processes of a different kind, and which therefore are particularly suitable for one or other application. Examples include polymers which are particularly suitable for blow-molding or for blown film production.

It is known that a particularly desirable feature, inter alia, of polymers for use in the processing methods just mentioned is a very broad molecular weight distribution.

It is an object of the present invention to provide, within the type of process defined at the outset, a particular embodiment whereby polymers can be obtained which have an improved spectrum of properties, in particular a broader molecular weight distribution, compared to polymers obtained by conventional methods of the type in question.

We have found that this object is achieved by using a catalyst (1) which contains a chromium-hydrocarbon complex (1.2) of a particular type on a particular carrier (1.1). In general it is advantageous, though not essential, to employ this catalyst together with a particular co-catalyst (2).

Accordingly, the present invention relates to a process for the preparation of ethylene homopolymers and ethylene copolymers with minor amounts of $C_3$–$C_6$-α-monoolefins by polymerizing the monomer or monomers at from 30° to 200° C., especially from 50° to 150° C., under a pressure of from 0.1 to 200 bars, especially from 1 to 60 bars, by means of a supported catalyst (1) which contains a chromium-hydrocarbon complex (1.2) on an inorganic oxide carrier (1.1), wherein (1) a supported catalyst is employed, which contains
 (1.1) on a finely divided, porous, inorganic oxide carrier, having a particle diameter of from 1 to 1,000 μm, preferably from 1 to 400 μm, a pore volume of from 0.3 to 3, preferably from 1 to 2.5, cm$^3$/g and a surface area of from 100 to 1,000, preferably from 200 to 700, m$^2$/g and which has the formula $SiO_2.aAl_2O_3$, where a is a number from 0 to 2, especially from 0 to 0.5, (1.2) a chromium-hydrocarbon complex of the formula RCrACrR where R is a cyclic and/or open-chain hydrocarbon or hydrocarbon radical which contains 2n and 2n+1 carbon atoms respectively and from 1 to n, preferably from 2 to n, non-cumulated, preferably exclusively olefinic, double bonds, n being an integer from 2 to 10, preferably from 2 to 5, Cr is chromium and A is cyclooctatetraene or a divalent n-octatetraene radical, which is unsubstituted or in which up to 8 hydrogen atoms of the cyclooctatetraene or n-octatetraene radical can be substituted by $C_1$–$C_4$-alkyl, especially $C_1$–$C_2$-alkyl, (2) with or without, but advantageously with, a cocatalyst of the formula

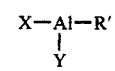

where X is chlorine, hydrogen, R' or OR', preferably hydrogen, R' or OR', Y is R' or OR', preferably R', and R' is $C_1$–$C_{18}$-alkyl, preferably $C_1$–$C_{12}$-alkyl and especially $C_2$–$C_6$-alkyl, with the provisos that (i) the supported catalyst (1) contains from 0.01 to 10, preferably from 0.1 to 8, % by weight, calculated as chromium and based on carrier (1.1), of the complex compound (1.2) and
(ii) that, where the co-catalyst is present, the atomic ratio of chromium in the supported catalyst (1) to aluminum in the co-catalyst (2) is up to 1:1,000, preferably from 1:0.1 to 1:200 and especially from 1:1 to 1:100.

The following details may be noted concerning the process according to the invention:

The polymerization process as such can, taking due account of the characterizing features, be carried out in virtually all the relevant conventional embodiments of a Ziegler or Phillips olefin polymerization, for example as a batchwise, cyclic or continuous process, which can be, for instance, a suspension polymerization, solution polymerization or dry phase polymerization process. The embodiments mentioned are well-known from the literature and from industrial practice and do not require more detailed comment here.

It is however to be noted that the process is particularly suitable for the preparation of ethylene homopolymers and that where it is used to prepare copolymers of ethylene with $C_3$–$C_6$-α-monoolefins, suitable α-monoolefins are especially propene, but-1-ene, 4-methylpent-1-ene and hex-1-ene. The molecular weights of the polymers can be regulated in the relevant conventional manner, especially by means of hydrogen.

The following may be noted concerning the novel supported catalyst (1) as such:

The catalyst contains a chromium-hydrocarbon complex (1.2) of a particular type, on a particular carrier (1.1).

The carrier (1.1) is in general an alumosilicate or especially a silica; it is important that it should conform to the stated properties. We have found that particularly suitable carriers are those which are obtained in accordance with stage (1) of the process described in British Pat. No. 1,550,951, especially if the starting material is a hydrogel obtained in accordance with preliminary stages (A) to (D) of the same patent, ie. a hydrogel obtainable by the process described in British Pat. No. 1,368,711. Further, we have found that the carrier should be as free as possible from adsorbed compounds which contain hydroxyl groups, such as water or alcohols. To (i) remove such compounds (by drying) or (ii) remove the hydroxyl groups (by neutralizing), the relevant conventional methods can be used, such as (i) drying the carrier at an elevated temperature and/or under reduced pressure and/or under a dry stream of gas, or (ii) treating the carrier with an alkyl-aluminum compound, for example of the same chemical nature as the co-catalyst (2) optionally employed in the present invention. In other respects, the procedure followed can in general terms be similar to that described for stage (1.1) of British Pat. No. 1,551,306. We have found that a combination of (i) drying and (ii) neutralizing can be particularly advantageous.

The chromium-hydrocarbon complex (1.2) must conform to the stated formula RCrACrR, examples being compounds where R is cyclododecatriene, cyclooctatetraene, cyclooctatriene, cyclooctadiene, cycloheptatriene, cycloheptadiene, cyclohexadiene, cyclopentadiene, butadiene or their $C_1$–$C_4$-alkyl-substituted derivatives, or the corresponding hydrocarbon radicals, and A is cyclooctatetraene or octamethylcyclooctatetraene or a divalent n-octatetraene or octamethyl-n-octatetraene radical.

We have found that complex compounds which are particularly suitable for the purpose of the invention are those where R is cyclooctatetraene, cyclooctatriene, cyclopentadiene and butadiene or their methyl-substituted or ethyl-substituted derivatives or the corresponding hydrocarbon radicals and A is cyclooctatetraene or a divalent n-octatetraene radical.

Amongst these, in turn, those where R is cyclooctatetraene, butadiene or a monovalent cyclopentadienyl radical and A is cyclooctatetraene or a divalent n-octatetraene radical are particularly preferred.

For the purposes of the present invention, the complex compounds (1.2) can of course be used as individual compounds or as mixtures of two or more such compounds.

The complexes in question are a known type of compound, so that a description of their method of preparation is not required here; such a description is to be found, for example, in British Pat. No. 1,128,128 and in the Thesis "Tris-(cyclopentatetraene)-dichromium, properties and reactions" by W. Geibel, Ruhr University of Bochum, 1977.

The preparation of the actual supported catalyst (1), ie. the application of the chromium-hydrocarbon complex (1.2) to the carrier (1.1), can be carried out in the relevant conventional manner. We have found, however, that it is in general advantageous to charge the carrier from a solution of the complex, where necessary with evaporation of the solvent, suitable solvents being relatively low-boiling saturated aliphatic and/or aromatic hydrocarbons, for example n-pentane, n-heptane, toluene or benzene. However, in many cases it is equally successful to charge the carrier (1.1) with the complex (1.2) by vapor deposition, in particular under reduced pressure.

It has already been explained at the outset that supported catalysts of the type according to the invention permit particularly sensitive control of the molecular weight of the polymer by means of hydrogen, and that even relatively small amounts of hydrogen produce a relatively great increase in productivity. We have found that this desirable property is particularly pronounced in the case of, for example, supported catalysts based on chromium-hydrocarbon complexes (1.2), in which R is a monovalent cyclopentadienyl radical and A is a divalent n-octatetraene radical. Supported catalysts based on complex compounds in which R is cyclooctatetraene or butadiene and A is cyclooctatetraene do not display this property to quite such a high degree.

In the process according to the invention it is not absolutely essential, but is advantageous, to employ the supported catalyst (1) together with co-catalysts (2) of the stated formula. The latter influence the process in the sense of increasing the productivity, based on supported catalyst (1), under otherwise similar conditions.

The formula given for the co-catalysts also embraces the aluminum-organic compounds employed in a Ziegler or Phillips olefin polymerization. Examples of suitable compounds are those of the formula $(C_2H_5)_3Al$, $(i-C_4H_9)_3Al$, $(C_2H_5)_2AlH$, $(C_2H_5)_2AlOC_2H_5$ or $(C_2H_5)Al(OC_2H_5)_2$. Isoprenyl-aluminum can also be used.

For the purposes of the invention the co-catalysts (2), again, can of course be employed in the form of individual compounds or of mixtures of complexes of two or more such compounds.

The Examples which follow illustrate the invention without limiting its scope.

EXAMPLE 1

Preparation of the supported catalyst (1)

A suspension of 49.0 g of silica ($SiO_2$, particle diameter 40–300 μm, pore volume 1.9 $cm^3$/g, surface area 330 $m^2$/g), which was dried for 12 hours in a stream of argon at 600° C., in 300 ml of oxygen-free heptane is prepared. A solution of 5 g of diethyl-aluminum methoxide in 125 g of heptane is added to this suspension and the mixture is stirred for 4 hours at room temperature. The solid reaction product is then isolated by driving off the heptane at room temperature under a pressure of 5 mbars. 0.37 g of a chromium-hydrocarbon complex, in which R and A are cyclooctatetraene, in 250 ml of toluene is then added, the mixture is stirred for 4 hours at room temperature and the toluene is removed by pumping off at room temperature under a pressure of 5 mbars. Analysis of the pale brown supported catalyst thus obtained shows 0.17% by weight of chromium, based on carrier.

Polymerization 1.75 g of the supported catalyst (1) are introduced into a stirred autoclave which is charged with 5 liters, corresponding to about 50% of its capacity, of isobutane. Polymerization is then carried out for a period of 2 hours with stirring at an ethylene pressure of 25 bar and at 105° C., these parameters being kept constant by a regulating system. Thereafter, the polymerization is stopped by letting down the autoclave.

Details of the product are given in the Table below.

EXAMPLE 2

Preparation of the supported catalyst (1)

This is carried out as in Example 1.

Polymerization 1.2 g of the supported catalyst (1) and 0.04 g of triethyl-aluminum (2) (corresponding to an atomic ratio of chromium in the supported catalyst to aluminum in the co-catalyst of 1:9), the latter compound as a solution in 10 ml of dry heptane, are introduced successively into a stirred autoclave which is charged with 5 liters, corresponding to about 50% of its capacity, of isobutane. In other respects, the polymerization is carried out as in Example 1.

Details of the product are given in the Table below.

EXAMPLE 3

Preparation of the supported catalyst (1)

This is carried out as in Example 1.

Polymerization 1.22 g of the supported catalyst (1) and 3.0 g of triethyl-aluminum (2) (corresponding to an atomic ratio of chromium in the supported catalyst to aluminum in the co-catalyst of 1:660), the latter compound as a solution in 20 ml of dry heptane, are introduced successively into a stirred autoclave which is charged with 5 liters, corresponding to about 50% of its capacity, of isobutane. 5 bars of hydrogen are then forced in, with stirring. Polymerization is effected at 90° C. under a total pressure of 45 bars which is maintained by constantly forcing in more ethylene. After 2 hours, the polymerization is stopped by letting down the autoclave.

Details of the product obtained are again shown in the Table.

EXAMPLE 4

Preparation of the supported catalyst (1)

A suspension of 53.33 g of silica (SiO$_2$, particle diameter 40-150 μm, pore volume 1.6 cm$^3$/g, surface area 300 m$^2$/g), which was dried for 10 hours in a stream of argon at 500° C., in 200 g of toluene is prepared. This suspension is combined with a solution of 0.57 g of a chromium-hydrocarbon complex, in which R and A are cyclooctatetraene, in 200 g of toluene. The suspension obtained is stirred for 4 hours at room temperature and the solid phase is isolated by filtering and drying at room temperature under a pressure of 2 mbars. The supported catalyst thus obtained contains 0.27% by weight of chromium, based on carrier.

Polymerization 1.3 g of the supported catalyst (1) and 0.05 g of triethyl-aluminum (2) (corresponding to an atomic ratio of chromium in the supported catalyst to aluminum in the co-catalyst of 1:6.5), the latter dissolved in 10 parts by weight of heptane, are introduced successively into a stirred autoclave which is charged with 5 liters, corresponding to about 50% of its capacity, of isobutane. Polymerization is then carried out for a period of 2 hours, with stirring, at an ethylene pressure of 25 bars and at 70° C., these parameters being kept constant by a regulating system. Thereafter, the polymerization is stopped by letting down the autoclave.

Details of the product are given in the Table below.

EXAMPLE 5

Preparation of the supported catalyst (1)

A suspension of 17.3 g of silica (SiO$_2$, particle diameter 40-300 μm, pore volume 2.1 cm$^3$/g, surface area 625 m$^2$/g), which was dried for 5 hours in a stream of argon at 600° C., in 200 g of dry heptane is prepared. 0.6 g of a chromium-hydrocarbon complex, in which R is a monovalent cyclopentadienyl radical and A is a divalent n-octatetraene radical, is added to the suspension and the mixture is kept for 2 hours at 50° C., with stirring, after which the solid is filtered off and dried at room temperature under 5 mbars pressure. The supported catalyst thus obtained contains 1.06 percent by weight of chromium, based on carrier.

Polymerization 0.27 g of the supported catalyst (1) and 0.08 g of isoprenyl-aluminum (2) (corresponding to an atomic ratio of chromium in the supported catalyst to aluminum in the co-catalyst of 1:8), the latter dissolved in 10 parts by weight of dry heptane, are introduced successively into a stirred autoclave which is charged with 400 g, corresponding to about 50% of its capacity, of n-heptane. Thereafter, 2 bars of hydrogen are forced in, with stirring. The polymerization is carried out at 95° C. under a total pressure of 35 bars, which is maintained by continually forcing in additional ethylene. After 2 hours, the polymerization is stopped by letting down the autoclave.

Details of the product thus obtained are shown in the Table.

EXAMPLE 6

Preparation of the supported catalyst (1)

This is carried out as in Example 5.

Polymerization 0.13 g of the supported catalyst (1) and 0.05 g of triethyl-aluminum (2) (corresponding to an atomic ratio of chromium in the supported catalyst to aluminum in the co-catalyst of 1:16), the latter dissolved in 10 parts by weight of heptane, are introduced successively into a stirred autoclave which is charged with 400 g, corresponding to about 50% of its capacity, of n-heptane. Thereafter, 5 bars of hydrogen are forced in, with stirring. The polymerization is carried out at 75° C. under a total pressure of 35 bars, which is maintained by continually forcing in additional ethylene. After 2 hours, the polymerization is stopped by letting down the autoclave.

Data on the product obtained are shown in the Table which follows.

EXAMPLE 7

Preparation of the supported catalyst (1)

A suspension of 20 g of silica (SiO$_2$, particle diameter 40-150 μm, pore volume 1.6 cm$^3$/g, surface area 300 m$^2$/g), which was dried for 10 hours in a stream of argon at 600° C., in 150 parts by weight of heptane is prepared. This suspension is combined with a solution of 0.49 g of a chromium-hydrocarbon complex, in which R is butadiene and A is cyclooctatetraene, in 50 ml of heptane. The suspension obtained is stirred for 4 hours at 50° C. and the solid phase is isolated by filtering and drying at room temperature under a pressure of 5 mbars. The supported catalyst thus obtained contains 0.7% by weight of chromium, based on carrier.

Polymerization 0.35 g of the supported catalyst (1) and 0.05 g of triethyl-aluminum (2) (corresponding to an atomic ratio of chromium in the supported catalyst to aluminum in the co-catalyst of 1:9.3), the latter dissolved in 10 ml of heptane, are introduced successively into a stirred autoclave which is charged with 400 g, corresponding to about 50% of its capacity, of n-heptane. Thereafter, 2 bars of hydrogen are forced in, with stirring. The polymerization is carried out at 90° C. under a total pressure of 35 bars, which is maintained by continually forcing in additional ethylene. After 2 hours, the polymerization is stopped by letting down the autoclave.

Data on the product obtained are shown in the Table which follows.

In the Table, PE stands for polyethylene and SC for supported catalyst.

| Example | Yield of PE [g] | g of PE/ g of SC | g of PE/ g of Cr | Bulk density | Pourability+ [g/sec] | High load melt index [g/10 min] 21.6 Kp | Melt index [g/10 min] 2.16 Kp |
|---|---|---|---|---|---|---|---|
| 1 | 530 | 303 | 178,200 | 444 | 5.1 | 9.7 | 0.03 |
| 2 | 500 | 417 | 245,000 | 461 | 6.1 | 6.8 | 0.02 |
| 3 | 410 | 335 | 197,100 | 380 | 6.5 | 32.9 | 0.51 |
| 4 | 410 | 315 | 116,800 | 410 | 5.9 | 0.5 | — |
| 5 | 328 | 1,210 | 114,200 | 360 | 4.3 | 9.7 | 0.1 |
| 6 | 330 | 2,480 | 234,200 | 370 | 5.6 | 212 | 3.9 |
| 7 | 365 | 1,040 | 149,000 | 420 | 5.7 | 14.5 | 0.2 |

+measured according to ASTM D 1895-67, Method A

We claim:
1. A process for the preparation of ethylene homopolymers and ethylene copolymers with minor amounts of $C_3$–$C_6$-α-monoolefins by polymerizing the monomer or monomers at from 30° to 200° C. under a pressure of from 0.1 to 200 bars, by means of a supported catalyst (1) which contains a chromium-hydrocarbon complex (1.2) on an inorganic oxide carrier (1.1), wherein
(1) a supported catalyst is employed, which contains
(1.1) on a finely divided, porous, inorganic oxide carrier, having a particle diameter of from 1 to 1,000 μm, a pore volume of from 0.3 to 3 $cm^3/g$ and a surface area of from 100 to 1,000 $m^2/g$ and which has the formula $SiO_2.aAl_2O_3$, where a is a number from 0 to 2, (1.2) a chromium-hydrocarbon complex of the formula

RCrACrR where R is a cyclic and/or open-chain hydrocarbon or hydrocarbon radical which contains 2n and 2n+1 carbon atoms respectively and from 1 to n non-cumulated double bonds, n being an integer from 2 to 10, Cr is chromium and A is cyclooctatetraene or a divalent n-octatetraene radical, which is unsubstituted or in which up to 8 hydrogen atoms of the cyclooctatetraene or n-octatetraene radical can be substituted by $C_1$–$C_4$-alkyl,
(2) with or without a co-catalyst of the formula

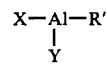

where X is chlorine, hydrogen, R' or OR', Y is R' and OR' and R' is $C_1$–$C_{18}$-alkyl, with the provisos that (i) the supported catalyst (1) contains from 0.01 to 10% by weight, calculated as chromium and based on carrier (1.1), of the complex compound (1.2) and (ii) that, where the co-catalyst is present, the atomic ratio of chromium in the supported catalyst (1) to aluminum in the co-catalyst (2) is up to 1:1,000.

* * * * *